G. M. & S. H. SEWARD.
Seed Planter.

No. 48,104.  Patented June 6, 1865.

Witnesses.
Rufus H. Sanford
Nelson W. Clark

Inventors.
Geo. M. Seward
Saml. H. Seward
By their Atty
John E. Earle

UNITED STATES PATENT OFFICE.

GEO. M. SEWARD AND SAML. H. SEWARD, OF GUILFORD, CONNECTICUT.

IMPROVEMENT IN SEED-PLANTERS.

Specification forming part of Letters Patent No. 48,104, dated June 6, 1865.

*To all whom it may concern:*

Be it known that we, GEO. M. SEWARD and SAML. H. SEWARD, of Guilford, in the county of New Haven and State of Connecticut, have invented a new and useful Improvement in Seed-Planters; and we do hereby declare the following to be a full, clear, and exact description of the same, when taken in connection with the accompanying drawings and the letters of reference marked thereon, and which said drawings constitute part of this specification, and represent, in—

Figure 1:
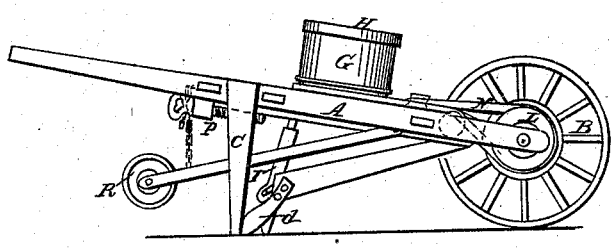
Figure 2:
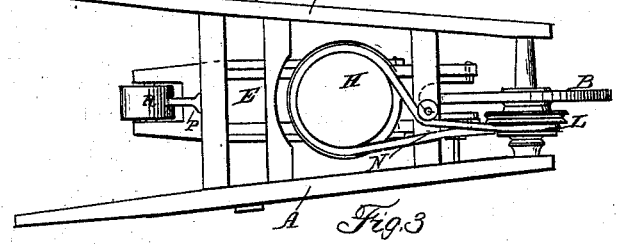
Figure 3:
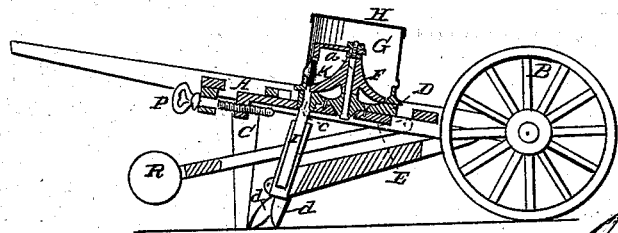

Figure 1, a side view; Fig. 2, a top view; Fig. 3, a vertical central section; and in Fig. 4, a top view of the disk for delivering the seeds.

Similar letters indicate corresponding parts.

Our invention relates to improvements in the seed-planter invented by Martin and Samuel L. Seward, (fathers of the present inventors,) and for which Letters Patent were issued the 27th July, 1839; and our invention consists in revolving the hopper entire instead of revolving a false bottom, as in the original machine; also, in a mechanism for tightening the belt which revolves the hopper.

To enable others skilled in the art to construct and use our invention, we will proceed to fully describe the same as illustrated in the accompanying drawings.

The mechanism of our seed-planter is placed upon a light-framed barrow, A, running upon one or more wheels, B, and supported, when at rest, upon legs C.

D is a metal plate fixed to an adjustable frame, E.

F is a disk supported on the plate E, so as to revolve upon a spindle, *a*.

Figure 4:

G is a hopper, which consists of a cylinder of tin or similar metal, secured to the said disk F or forming part of the same, as seen in Fig. 3, and is closed by a cover, H, or not, as desired. The said disk F is pierced with holes, as seen in Fig. 4, which said holes should be proportioned to the size of the seed to be planted. Through the plate D a single hole, *c*, communicates with a conductor, I, which leads to the flukes *d*, which are constructed so as to form the drill for the seeds and cover the same as the machine advances.

Within the hopper, and firmly fixed so as not to revolve, is placed a brush, K, directly over the opening *c* in the plate D, as seen in Fig. 3. Power to revolve the hopper is communicated from pulleys L on the shaft of the wheel B by a belt, N, running therefrom around the hopper G, as seen in Figs. 1 and 2.

The seeds to be planted are placed in the hopper, and when the barrow is moved the hopper revolves, (a single seed being in each hole of the disk F.) As each hole in the disk F comes over the hole *c* it will fall down through the conductor I. The brush K prevents other seeds than the one in the hole of the disk from falling through.

In the original machine the cylinder of the hopper was stationary while the disk revolved, which made a joint in the hopper around the disk, into which dust or dirt from the seeds would enter and clog the disk, thereby materially detracting from the successful working of the machine, which trouble, by our invention, is entirely overcome. In the original machine the belt could not be tightened—another objection to the successful working of that machine, which objection we have overcome by placing a hopper upon an adjustable frame, E. The said frame is adjusted by means of a screw, P, (see Fig. 3,) to draw the hopper from the wheel to tighten the belt or force it toward the wheel to slacken it.

R is a roll to regulate the depth of the drill.

For different size seeds different disks F, pierced with holes of the requisite size, should be used. Different velocities given to the hopper from different-sized pulleys on the driving-shaft will drop the seeds at greater or less distance apart, as the velocity is less or more.

Having therefore thus fully described our invention, what we claim as new and useful, and desire to secure by Letters Patent, is—

1. Constructing the hopper G so as to revolve with the disk F, when the same is combined with the plate D and the brush K or its equivalent, substantially in the manner and for the purpose described.

2. Adjusting the hopper G, constructed and operating in the manner described, by means of the screw P, substantially as and for the purpose specified.

GEORGE M. SEWARD.
SAMUEL H. SEWARD.

Witnesses:
EDWARD R. LANDON,
BEVERLY MONROW.